US008649755B2

(12) United States Patent
Moeglein et al.

(10) Patent No.: US 8,649,755 B2
(45) Date of Patent: Feb. 11, 2014

(54) TIMING CIRCUIT CALIBRATION IN DEVICES WITH SELECTABLE POWER MODES

(75) Inventors: Mark L. Moeglein, Ashland, OR (US); Ahmad Jalali, Rancho Santa Fe, CA (US); Bin Tian, San Diego, CA (US); Scott King, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 13/329,174

(22) Filed: Dec. 16, 2011

(65) Prior Publication Data

US 2013/0154693 A1 Jun. 20, 2013

(51) Int. Cl.
*H04B 1/16* (2006.01)

(52) U.S. Cl.
USPC ................. 455/343.2; 455/456.6; 340/539.3

(58) Field of Classification Search
USPC ............. 455/343.2, 574, 414.2, 456.1–456.6, 455/352; 340/539, 573.4
See application file for complete search history.

(56) References Cited

U.S. PATENT DOCUMENTS

| | | | |
|---|---|---|---|
| 5,831,574 A | 11/1998 | Krasner | |
| 6,016,119 A | 1/2000 | Krasner | |
| 6,067,460 A | 5/2000 | Alanara et al. | |
| 6,104,338 A | 8/2000 | Krasner | |
| 6,108,553 A | 8/2000 | Silventoinen et al. | |
| 6,131,067 A | 10/2000 | Girerd et al. | |
| 6,144,858 A | 11/2000 | Masuda | |
| 6,259,399 B1 | 7/2001 | Krasner | |
| 6,313,786 B1 | 11/2001 | Sheynblat et al. | |
| 6,317,049 B1 | 11/2001 | Toubia et al. | |
| 6,661,372 B1 | 12/2003 | Girerd et al. | |
| 7,187,278 B2 | 3/2007 | Biffar | |
| 7,227,498 B2 | 6/2007 | Soliman | |
| 7,257,411 B2 | 8/2007 | Gwon et al. | |

(Continued)

FOREIGN PATENT DOCUMENTS

| | | |
|---|---|---|
| CN | 1375999 A | 10/2002 |
| DE | 102004010711 A1 | 9/2005 |

(Continued)

OTHER PUBLICATIONS

Partial International Search Report—PCT/US2012/069197—ISA/EPO—Mar. 22, 2013.

(Continued)

*Primary Examiner* — Christian Hannon
(74) *Attorney, Agent, or Firm* — Berkeley Law & Technology Group, LLP

(57) ABSTRACT

Techniques are provided which may be implemented in various methods, apparatuses, and/or articles of manufacture for use by a device that is operable in a plurality of modes, including "higher power mode" and a "lower power mode". A timing circuit may be set based, at least in part, on a phase value obtained from a signal from a ground-based transmitter, and operation of the device may be selectively transitioned to a lower power mode wherein the device uses the timing circuit. In certain example implementations, operation of the device to the lower power mode may be selectively transition and based, at least in part, on a determination that one or more attribute values satisfy a profile test indicating that the electronic device is likely to be within a characterized environment, and/or a determination that the electronic device is likely to be in a constrained motion state.

30 Claims, 4 Drawing Sheets

(56) References Cited

U.S. PATENT DOCUMENTS

| | | |
|---|---|---|
| 7,327,245 B2 | 2/2008 | Krumm et al. |
| 7,426,197 B2 | 9/2008 | Schotten et al. |
| 7,522,685 B2 | 4/2009 | Zakrewski |
| 7,535,417 B2 | 5/2009 | Atkinson |
| 7,639,131 B2 | 12/2009 | Mock et al. |
| 7,660,658 B2 | 2/2010 | Sheynblat |
| 7,702,370 B2 | 4/2010 | Persico |
| 7,825,794 B2 | 11/2010 | Janetis et al. |
| 7,865,307 B2 | 1/2011 | Gronemeyer |
| 2002/0127967 A1 | 9/2002 | Najafi |
| 2003/0081657 A1 | 5/2003 | Ranta |
| 2004/0192352 A1 | 9/2004 | Vallstrom et al. |
| 2004/0203904 A1 | 10/2004 | Gwon et al. |
| 2005/0020266 A1 | 1/2005 | Backes et al. |
| 2005/0233700 A1 | 10/2005 | Pecen et al. |
| 2006/0280198 A1 | 12/2006 | Lee et al. |
| 2007/0049295 A1 | 3/2007 | Soliman et al. |
| 2007/0149211 A1 | 6/2007 | Dunn et al. |
| 2007/0268138 A1* | 11/2007 | Chung et al. ............... 340/572.1 |
| 2008/0008510 A1 | 1/2008 | Lee et al. |
| 2008/0055109 A1 | 3/2008 | Freathy et al. |
| 2008/0170551 A1 | 7/2008 | Zaks |
| 2008/0174422 A1 | 7/2008 | Freathy et al. |
| 2008/0222440 A1 | 9/2008 | Jones et al. |
| 2008/0303601 A1 | 12/2008 | Young |
| 2008/0303663 A1 | 12/2008 | Smith et al. |
| 2009/0278735 A1 | 11/2009 | Jin et al. |
| 2009/0278738 A1 | 11/2009 | Gopinath |
| 2009/0289844 A1 | 11/2009 | Palsgrove et al. |
| 2010/0015916 A1 | 1/2010 | Holcman et al. |
| 2010/0081458 A1 | 4/2010 | Sheynblat et al. |
| 2010/0090852 A1 | 4/2010 | Eitan et al. |
| 2010/0113061 A1 | 5/2010 | Holcman |
| 2010/0151878 A1 | 6/2010 | Nader et al. |
| 2010/0162021 A1 | 6/2010 | Kennard et al. |
| 2010/0203901 A1 | 8/2010 | Dinoff et al. |
| 2010/0248678 A1 | 9/2010 | Babitch et al. |
| 2010/0317295 A1 | 12/2010 | Borsella et al. |
| 2011/0009155 A1 | 1/2011 | Choumaru et al. |
| 2013/0159749 A1 | 6/2013 | Moeglein et al. |

FOREIGN PATENT DOCUMENTS

| | | |
|---|---|---|
| EP | 0748080 A1 | 12/1996 |
| JP | 2005236835 A | 9/2005 |
| JP | 2006508603 A | 3/2006 |
| JP | 2006153695 A | 6/2006 |
| JP | 2006287644 A | 10/2006 |
| JP | 2007020074 A | 1/2007 |
| KR | 20050063802 A | 6/2005 |
| WO | 2001020936 A1 | 3/2001 |
| WO | 2004042941 A1 | 5/2004 |
| WO | 2004052041 A1 | 6/2004 |
| WO | 2004097447 A1 | 11/2004 |
| WO | 2007068501 A2 | 6/2007 |

OTHER PUBLICATIONS

Qualcomm Repeater Technologies to Improve Network Performance, 80-W0013-1 Rev A, Qualcomm Incorporated, San Diego, California, Mar. 20, 2003, pp. 1-22.

International Search Report and Written Opinion—PCT/US2009/058360, International Search Authority—European Patent Office—Jan. 12, 2009 (050352WO), 9 pages.

International Search Report and Written Opinion—PCT/US2012/069197—ISA/EPO—Aug. 12, 2008.

* cited by examiner

TIMING CIRCUIT CALIBRATION IN DEVICES WITH SELECTABLE POWER MODES

BACKGROUND

1. Field

The subject matter disclosed herein relates to electronic devices, and more particularly to methods, apparatuses and articles of manufacture for use in electronic devices that may selectively operate in different power modes.

2. Information

The Global Positioning System (GPS) and other like satellite positioning systems (SPSs) have enabled navigation services for devices in outdoor environments. Since some satellite signals may not be reliably received and/or acquired in an indoor environment, different techniques may be employed to enable position location and/or other like navigation services. In an indoor application, for example, certain devices may obtain a position fix by measuring ranges to terrestrial wireless access points (e.g., IEEE Std. 802.11 access points, etc.) that are positioned at known locations. Such ranges may be measured, for example, by obtaining a MAC ID address from signals received from such access points and measuring one or more characteristics of the received signals such as, for example, a signal strength, a round trip time (RTT) delay, a time of flight (TOF), just to name a few examples. In addition to SPSs and indoor positioning systems, existing wireless carrier infrastructures may enable observed time difference of arrival (OTDOA) and/or advanced forward link trilateration (AFLT) techniques for estimating locations of applicable devices. For example, with knowledge of the locations of neighboring base station transmitters and time-reference data, a device may estimate a range to such base station transmitters based upon an observed signal propagation delay (e.g., by comparing a phase value of an acquired signal to a time reference).

While the above identified positioning techniques have been employed by mobile handsets and other personal navigation devices, such positioning techniques may also be employed by location tracking devices such as asset tracking tags, pet collars, child tracking tags, and/or the like. Thus, for example, a location tracking device may obtain position fixes using one or more of the above techniques which may be followed by a transmission of a message to a location server (e.g., over a wireless cellular network) to report a most recent position, etc. As a location tracking device may have limited battery capacity and/or possibly a long expected deployment, it may be beneficial to conserve electrical power usage.

SUMMARY

In accordance with certain aspects, a method may be implemented in a device that is operable in a plurality of selectable power modes, in which the method comprises setting a timing circuit based, at least in part, on a phase value included in one or more attribute values obtained from a signal acquired from a ground-based transmitter; and based, at least in part, on the one or more attribute values, selectively transitioning operation of the device to a lower power mode wherein at least a portion of a receiver used to acquire the signal is disabled and at least a portion of enabled device circuitry uses the timing circuit. In certain example implementations, such a method may further comprise selectively transitioning operation of the device to the lower power mode based, at least in part, on a determination that the one or more attribute values satisfy a profile test indicating that the device is likely to be within a characterized environment, and/or a determination that the device is likely to be in a constrained motion state.

In accordance with certain other aspects, an apparatus may be provided for use in a device that is operable in a plurality of selectable power modes. The apparatus may comprise means for setting a timing circuit based, at least in part, on a phase value included in one or more attribute values obtained from a signal acquired from a ground-based transmitter; and means for transitioning operation of the device to a lower power mode based, at least in part, on the one or more attribute values, wherein while the device is operating in the lower power mode at least a portion of a receiver used to acquire the signal is disabled and at least a portion of enabled device circuitry uses the timing circuit.

In accordance with yet another aspects, a device that is operable in a plurality of selectable power modes may comprise a receiver, a timing circuit, and a processing unit. The processing unit may set a timing circuit based, at least in part, on a phase value included in one or more attribute values obtained from a signal acquired from a ground-based transmitter using the receiving; and based, at least in part, on the one or more attribute values, selectively transition operation of the device to a lower power mode wherein at least a portion of the receiver is disabled and at least a portion of enabled device circuitry uses the timing circuit.

In accordance with still another aspect, an article of manufacture may be provided for use with a device that is operable in a plurality of selectable power modes. The article of manufacture may comprise a non-transitory computer readable medium having stored therein computer implementable instructions executable by a processing unit of the device to: set a timing circuit based, at least in part, on a phase value included in one or more attribute values obtained from a signal acquired from a ground-based transmitter; and transition operation of the device to a lower power mode based, at least in part, on the one or more attribute values, wherein while the device is operating in the lower power mode at least a portion of a receiver used to acquire the signal is disabled and at least a portion of enabled device circuitry uses the timing circuit.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
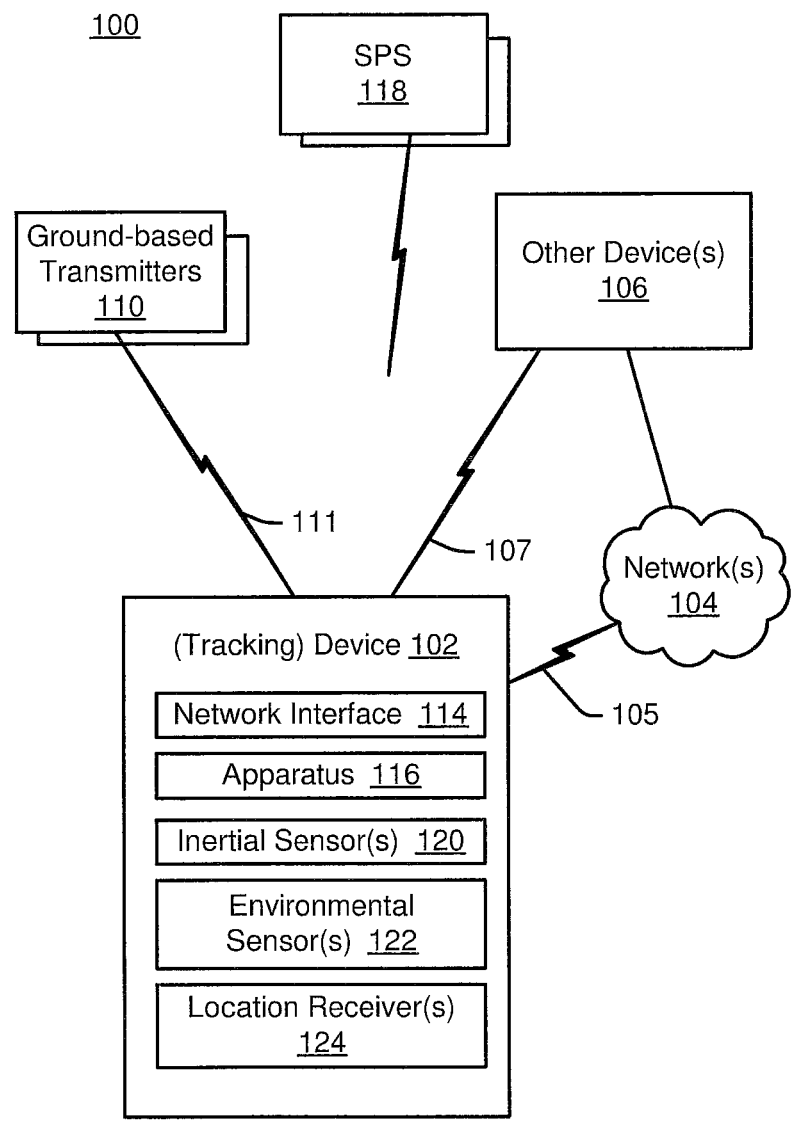
FIG. 1 is a schematic block diagram illustrating an example environment comprising a location tracking device that conserves power by selectively transitioning between different operating modes, in accordance with an implementation.

Techniques are provided herein which may be implemented in portable electronic devices capable of operating in a plurality of modes, in which certain modes may allow the device to conserve electrical power usage. Thus, certain example operational modes of a device may be considered as representing different power modes. For example, since a device may use different amounts of electrical power depending on its operational mode, one or more operational modes may be considered a "higher power mode", one or more operational modes may be considered a "medium power mode", and one or more operational modes may be considered "a lower power mode". Here, as implied, a device operating in a higher power mode may use more electrical power than it might if it were operating in a medium power mode or a lower power mode. Similarly, a device operating in a medium power mode may use more electrical power than it might if it were operating in a lower power mode.

As described in greater detail herein, in certain example implementations a device may operatively enable and disable certain components, circuits, and/or functions depending on its operational power mode. For example, in certain implementations with a device operating in a higher power mode the device may enable operation of one or more receivers, one or more transmitters, one or more sensors, etc. However, such an example device operating in a medium power mode may enable operation of one or more receivers and/or one or more sensors, but disable operation of one or more transmitters, etc. Further still, such an example device operating in a lower power mode may disable operation of one or more receivers, one or more sensors, one or more transmitters, etc., while enabling sufficient circuitry to at least allow the device to transition to another operational mode, e.g. at some later point in time.

With this in mind, various methods and apparatuses will now be described which may be used in a device to selectively transition the device from one power mode to another power mode in a manner which may promote conservation of electrical power in the device, e.g., to improve battery life.

As described in greater detail herein, an example device may operate in one or more power modes in which the device may characterize its environment using one or more on-board receivers and/or one or more on-board sensors. For example, an environment may be characterized based, at least in part, on one or more attribute values determined from one or more RF signals acquired by one or more receivers. For example, an environment may be characterized based, at least in part, on one or more attribute values determined from one or more signals generated by one or more on-board sensors (e.g., inertial sensors, environment sensors).

In accordance with one aspect, in characterizing an environment an example device may establish a "profile test" for the environment, e.g., based on one or more attribute values, or possibly obtain a profile test from another device. All or part of a profile test may be used by a device to determine whether it may or may not be located within the corresponding environment. For example, since a device may be moved into and out of a particular environment the device may selectively determine one or more attribute values from one or more acquired RF signals and/or one or more sensors and compare such attribute values to one or more corresponding conditions in one or more profile tests to determine if there is an adequate match. If there is an adequate match (i.e., a profile test is satisfied) then the device may infer that it is located within an environment corresponding to the satisfied profile test. Conversely, if there is not an adequate match (i.e., no profile test is satisfied) then the device may attempt to establish a new profile test for its environment or possibly attempt to obtain an applicable profile test for its environment from another device. Once a new profile test is established or obtained, it may be stored in memory within the device for future use, and/or transmitted to another device. Hence, in certain example implementations, a device may transition to one or more power modes as needed to characterize its environment, and/or otherwise establish, obtain, transmit, store, access, or modify one or more profile tests or some portion thereof.

In accordance with certain example implementations, various profile tests may be implemented, including all or part of one or more of the following non-limiting examples. In certain cities a profile test may compare or otherwise consider one or more historical and/or expected attribute values with one or more recently obtained attribute values. For example, one or more attribute values associated with a recorded history temperature and/or an expected temperature range for a particular environment may be compared to a more recently obtained attribute values, e.g. from a temperature probe. In certain instances, such a profile test may also take into consideration different times of day, a date, etc. Based upon such temperature related data, a probability score may, for example, be assigned for the device being within or without of a particular characterized environment. An example of this behavior may be for the device to infer it has been removed from the characterized environment and to possibly transition into a higher power state to determine its location.

In another example, a phase value and/or a relative phase value of one or more signals may have a certain range, stability and/or variance, forming an expected phase and an expected phase variation. Hence, for example, based, at least in part, on one or more attribute values relating to such phase readings, a device may infer that it is likely to be in a constrained motion state, or, conversely, that it is likely to have left a particular environment and therefore transition into a higher power state to determine its location. Again, one may note that various attribute values and environment characterizations may include temporal factors, such as time of day, day of week, etc. and may also include or otherwise relate to relative or absolute signal strength characterizations within certain environments.

In accordance with another aspect, it may be beneficial for a device to specifically transition from one power mode to another power mode, or conversely refrain from transitioning from one power mode to another power mode, while the device may be in transit. For example, certain devices may transition to a higher power mode in response to a determination that the device may be in transit, e.g., a location tracking device may be designed to track its movements during transit. Other devices, however, may be designed to reduce power consumption while transiting, e.g., a location tracking device may be designed to reduce power consumption by waiting to estimate and/or report out its location position after coming to a sufficient rest. Hence, as described in greater detail herein, in certain example implementations, a device may determine whether to transition from one power mode to another power mode based, at least in part, on a determination that the device is likely to be in a "constrained motion state". Further, in certain example implementations, a device may determine whether to attempt to characterize an environment based, at least in part, on a determination that the device is likely to be in a "constrained motion state".

A device may, for example, determine that it is likely to be in a constrained motion state based, at least in part, on one or more attribute values. For example, a device may compare attribute values for an acquired signal to determine if any changes occur over time, the presence of which may indicate that the device is in transit and therefore is not likely to be in a constrained motion state. For example, with a device in transit, it may be expected that attribute values relating to an acquired signal may change as the device moves closer or farther away from the transmitter. For example, one or more of a strength value, a phase value, and/or a frequency Doppler value for an acquired signal may increase or decrease over time as a device transits towards or away from transmitting device. Similarly, a device may, for example, compare one or more attribute values for one or more sensors to one or more applicable threshold values to determine if a device may or may not be in a constrained motion state. For example, one or more of an acceleration value, a perceived velocity value, a vibration value, a rotational motion value, a magnetic value, a sound value, a light value, a temperature value, etc., may be compared to a corresponding threshold value that may indicate whether the device may be in transit or in a constrained motion state. In certain instances, such threshold values may permit little to any detectable movements of the device in order for the device to be in a constrained motion state. In other instances, however, some threshold values may allow for the device to undergo certain detectable movements while in a constrained motion state.

As such, a threshold value or threshold range of values that may be considered in determining whether a device is or is not likely to be in a constrained motion state may, for example, be referred to simply as a motion constraint value. In certain example instances, a device may use one or more motion constraint values in a generic manner, e.g., regardless of its estimated location position, a characterized environment, an operating mode, etc. In certain other example instances, a device may use one or more particular motion constraint values based on its estimated position, a characterized environment or expected environment, its operating mode, and/or the like or some combination thereof. Hence, for example, in certain implementations a profile test may comprise one or more motion constraint values, which may correspond to one or more attribute values and relate to a particular environment.

It should be appreciated that a plurality of threshold values may exist, such that they may form an effective continuum of modes. For example, a likelihood that an environment around the device is changed may be determined as part of the profile test. In a further example, such likelihood may be used to determine one or more update rates for performing certain functions. In certain example implementations, a plurality of potential update rates may correspond to a plurality of different power modes.

As described in greater detail below, a device that is in a higher power mode or a medium power mode may, for example, acquire a signal from a ground-based transmitter and from such determine at least one attribute values, such as, a phase value. The phase value may be indicative of a clock time used in a transmitting device and/or other devices that may be operatively coupled thereto. For example, a phase value may be indicative of a network time or other like synchronized timing characteristic.

As such, a timing circuit within the device may be set based, at least in part, on such a phase value. With the timing circuit set and in response to a determination that a profile test is satisfied, a device may transition to a lower power mode, e.g., wherein at least a portion of a receiver used to acquire the signal may be disabled and at least a portion of the remaining enabled device circuitry may operate based, at least in part, on a clock signal generated by the timing circuit that was set. In certain example implementations, a transition to a lower power mode may be further contingent upon a determination that the device is more than likely in a constrained motion state.

With an example device in a lower power mode, remaining enabled device circuitry may subsequently determine that a transition is to occur to another power mode, e.g., a higher power mode or a medium power mode. For a device may be programmed to transition from a lower power mode according to a particular schedule. A schedule may, for example, specify that a transition is to occur at various times and/or after some passage of time to allow a device to obtain a position fix, enable use of one or more sensors, report a position fix, or for some other reasons. Hence, in certain example implementations a device may determine whether a transition from a lower power mode is to occur based, at least in part, on a time value (e.g., a set time, a timer expiration, etc.), and/or a timing accuracy value (e.g., based on an accuracy of the timing circuit since last set). In certain instances, a time value may, for example, be included in a profile test to possibly account for certain environments. In some example implementations a device may determine whether a transition from a lower power mode is to occur based, at least in part, on an inertial sensor value and/or an environmental sensor value, assuming that such sensors are enabled while the device is in a lower power mode. In still other example implementations a device may determine whether a transition from a lower power mode is to occur based, at least in part, on other information that may be available, such as, e.g., a battery power value (e.g., based on an estimated or measured battery life, a level of charge, etc.), a last position fix, a user input, and/or the like or some combination thereof.

Attention is now drawn to FIG. 1, which is a schematic block diagram illustrating an example environment 100 that comprises an example device 102 having an apparatus 116 that may be used to selectively transition device 102 between two or more operating modes, in accordance with an implementation.

As illustrated, environment 100 may also comprise one or more networks 104, one or more other devices 106, and one or more ground-based transmitters 110, all or some of which may be operatively coupled together via one or more wireless and/or wired communication links. Also illustrated is a representative SPS 118, which may comprise a GNSS and/or the like, and which transmit signals that may be received by device 102 (e.g., via a location receiver 124) and used for position location processing. In certain example instances, transmitters 110 may transmit one or more wireless signals 111 that may be received by a network interface 114 and/or location receivers 124 of device 102. In certain example instances, other devices 106 may transmit one or more wireless signals 107 that may be received by network interface 114 of device 102, and/or receive one or more wireless signals 107 that may be transmitted by network interface 114. In certain example instances, other devices 106 may transmit one or more signals over a wired communication link with network(s) 104, and/or receive one or more signals over a wired communication link with network(s) 104. In certain example instances, network(s) 104 may transmit one or more wireless signals 105 that may be received by network interface 114 of device 102, and/or receive one or more wireless signals 107 that may be transmitted by network interface 114. In certain examples, signals 111 may comprise an 1×CDMA pilot signal, an EVDO pilot signal, an LTE pilot signal, a cellular communication network signal, a wireless communication network signal, LORAN, broadcast communication network signals, a wireless ad-hoc network communication signal (e.g., Zigbee, etc.), and/or the like.

It should be understood that the techniques provided herein may make use of various different types of signals 111 that may be transmitted by various different types of transmitters 110. Thus by way of some non-limiting examples one or more ground-based transmitters may, for example, transmit some form of a continuous pilot signal, some form of a time multiplex pilot signal, some form of an Orthogonal Frequency-Division Multiplexing (OFDM) pilot signal, some form of an asynchronous Beacon broadcast, some form of an Advanced Forward Link Trilateration (AFLT) pilot signal, some form of a Code Division Multiple Access (CDMA) pilot signal, some form of a cellular communication network signal, some form of a wireless communication network signal, some form of a wireless ad-hoc network communication signal, some form of a wireless broadcast network signal, some form of a navigation beacon signal, and/or the like, or just to name a few.

By way of example, device 102 may comprise any electronic device that may be moved about by a user and/or attached to some other object that may be transported about in some manner, and which comprises a network interface 114 for receiving signals transmitted by transmitters 110 (e.g., access points, cell towers, beacons, satellites, etc.) and/or possibly other resources in network(s) 104, etc. Thus, by way of some examples, device 102 may comprise a location tracking device, such as, an asset tracking tag, a pet collar, a child tracking tag, and/or the like.

Apparatus 116 is representative of circuitry, such as, e.g., hardware, firmware, a combination of hardware and software, and/or a combination of firmware and software or other like logic that may be provided in device 102 and used, at least in part, to determine an operational power mode of device 102, e.g., as described herein.

Network(s) 104 may be representative of one or more communication and/or computing resources (e.g., devices and/or services) which device 102 may communicate with or through, e.g., via network interface 114 using one or more wired or wireless communication links. Thus, in certain instances device 102 may receive (or send) data and/or instructions via network(s) 104. In certain instances, device 102 may, for example, not only receive a signal from a transmitter 110, but may also transmit a signal to such a transmitter (e.g., having a receiver).

In certain example implementations, device 102 may be enabled to receive signals associated with one or more wireless communication networks, location services, and/or the like or any combination thereof which may be associated with one or more transmitters 110 and/or network(s) 104.

Device 102 may, for example, be enabled (e.g., via network interface 114) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, device 102 may be enabled, e.g., via network interface 114 or a location receiver 124, for use with various location service(s), such as, a Global Navigation Satellite System (GNSS), or other like satellite and/or terrestrial locating service, a location based service (e.g., via a cellular network, a WiFi network, etc.), and/or the like or some combination thereof.

One or more other devices 106 is illustrated as being connected to device 102 and/or network(s) 104 via one or more network interfaces (not shown), which in certain implementations may be similar to network interface 114. Other device 106 may, for example, comprise one or more computing platforms, one or more other devices, one or more appliances, one or more machines, and/or the like or some combination thereof. Apparatus 116 may, for example, obtain (e.g., via network interface 114) one or more attribute values, one or more motion constraint values, one or more profile tests, and/or the like or some combination thereof from one or more other devices 106.

Further, with apparatus 116 device 102 may, for example, determine one or more attribute values for one or more RF signals acquired by one or more receivers (e.g., in network interface 114, or one or more location receivers 124). With apparatus 116, device 102 may, for example, determine one or more attribute values for one or more inertial sensors 120 (e.g., accelerometers, gyrometers, gyroscopes, etc.), one or more environmental sensors 122 (e.g., magnetometers, compass, barometer, thermometer, temperature probes, stress gauge, microphone or other sound transducer, camera or other light sensitive sensors, etc.), and/or the like or some combination thereof.

Figure 2:
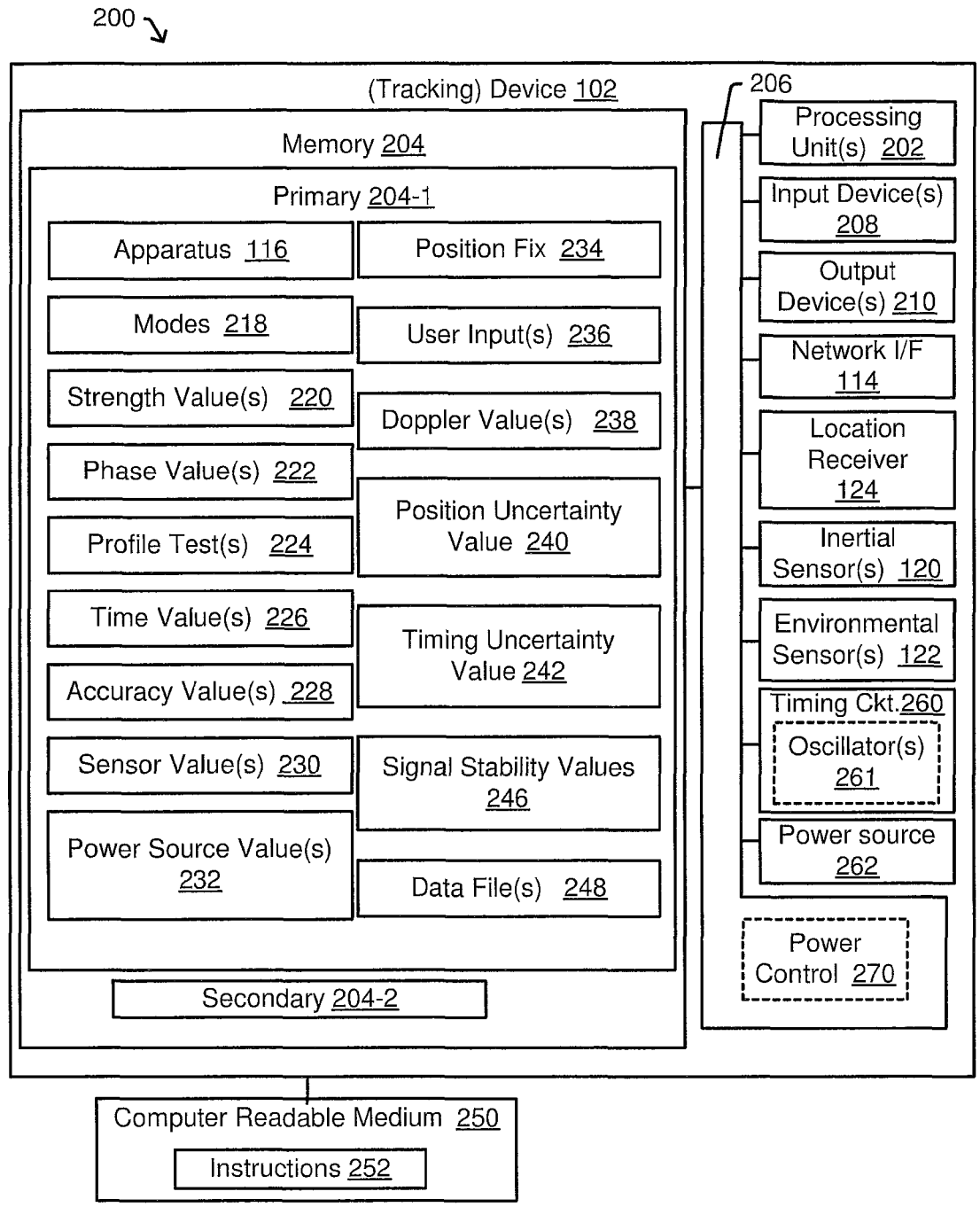
FIG. 2 is a schematic block diagram illustrating certain features of an example computing platform in the form of a location tracking device to conserve power by selectively transitioning between different operating modes, in accordance with an implementation.

FIG. 2 is a schematic block diagram illustrating certain features of an example computing platform 200 shown in the form of device 102 for use in selectively transitioning between two or more operating modes in a manner that may conserve power, in accordance with an implementation.

As illustrated device 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within device 102. Secondary memory 204-2 may comprise, for example, the same or similar type of memory as primary memory and/or one or more data storage devices or systems, such as, for example, a disk drive, a solid state memory drive, etc. In certain implementations, secondary memory may be operatively receptive of, or otherwise configurable to couple to, computer readable medium 250. Memory 204 and/or computer readable medium 250 may comprise instructions 252 associated with data processing, e.g., in accordance with the techniques and/or apparatus 116 (FIG. 1), as provided herein.

Device 102 may, for example, further comprise one or more user input devices 208, one or more output devices 210, one or more network interfaces 114, one or more location receivers 124, one or more inertial sensors 120, and/or one or more environmental sensors 122. In certain example implementations, an environmental sensor 122 may comprise a camera or some other form of a light sensitive sensor or photo detector, a microphone, a gas or smoke detector, a temperature probe, and/or the like.

Input device(s) 208 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 114 may, for example, provide connectivity to one or more transmitters 110 and/or network(s) 104 (FIG. 1), e.g., via one or more communication links. Location receiver 124 may, for example, obtain signals from one or more location services, SPS, etc. (not shown), which may be used in estimating a location of device 102 at certain times.

Processing unit(s) 202 and/or instructions 252 may, for example, provide or otherwise be associated with one or more encoded electrical signals stored in memory 204, such as, apparatus 116. At various times memory 204 may comprise one or more encoded electrical signals representing in some manner one or more modes 218, one or more signal strength values 220, one or more signal timing phase values 222, one or more profile tests 224, one or more time values 226 (e.g., associated with period time, a date, a schedule, a timer, etc.), one or more accuracy values 228 (e.g., associated with a time, a position, etc.), one or more sensor related attribute values 230 (e.g., associated with one or more measurements from one or more inertial or environmental sensors), one or more power source values 232 (e.g., associated with an available remaining power, used power, power consumption, certain threshold power level settings/indicators, etc.), one or more position fixes 234 (e.g., geographical or other map coordinates, velocity, altitude, ranges, etc.), one or more user inputs 236 (e.g., mode selections, mode overrides, mode preferences, on/off, etc.); one or more frequency Doppler values 238, one or more position uncertainty values 240, one or more time uncertainty values 242, one or more signal stability values 246, and/or all or part of one or more almanac, a neighbor list, or other like data compilation(s)/file(s) 248, etc., and/or the like or any combination thereof, e.g., as described in the various example techniques herein.

As further illustrated in FIG. 2, device 102 may comprise a timing circuit 260, which as described in various examples herein may be used when device 102 is in a lower power mode. Timing circuit 260 may generate a clock signal for use in a lower power mode. By way of example, timing circuit 260 may comprise a tuning fork crystal oscillator and/or the like which may be used to advance an internal clock time (e.g., between synchronization of the clock time with a reference time). Additionally, device 102 may comprise one or more power sources 262. By way of example, in certain instances a power source 262 may comprise a battery.

As illustrated simply by way of representation, a power control 270 may be provided in whole or part via connections 206 and/or elsewhere within device 102. Power control 270 may be response to processing unit 202 (e.g., running apparatus 116) to selectively enable or disable one or more circuits, receivers, transmitters, chips, sensors, interfaces, etc., within device 102 in some manner. Thus, for example, power control 270 may selectively power-up or power-down all or part of a circuit, etc., to enable or disable it in some manner, e.g., as may be defined by an operational mode. Hence, for example, power control 270 may power-down or other wise disable to some extent all or part of location receiver 124 and/or network interface 114 with device 102 in a lower power mode. Additionally, for example, power control 270 may power-up or other wise enable all or part of location receiver 124 and/or a receiver and/or a transmitter of network interface 114 with device 102 in another mode, e.g., a higher power mode or a medium power mode. Accordingly, power control 270 may comprise various hardware, firmware, and/or other like logic, such as, e.g., switches, logic gates, etc., that may serve to disable and/or enable various circuitry within device 102 and which may or may not be used depending on the operational mode of device 102.

Figure 3:
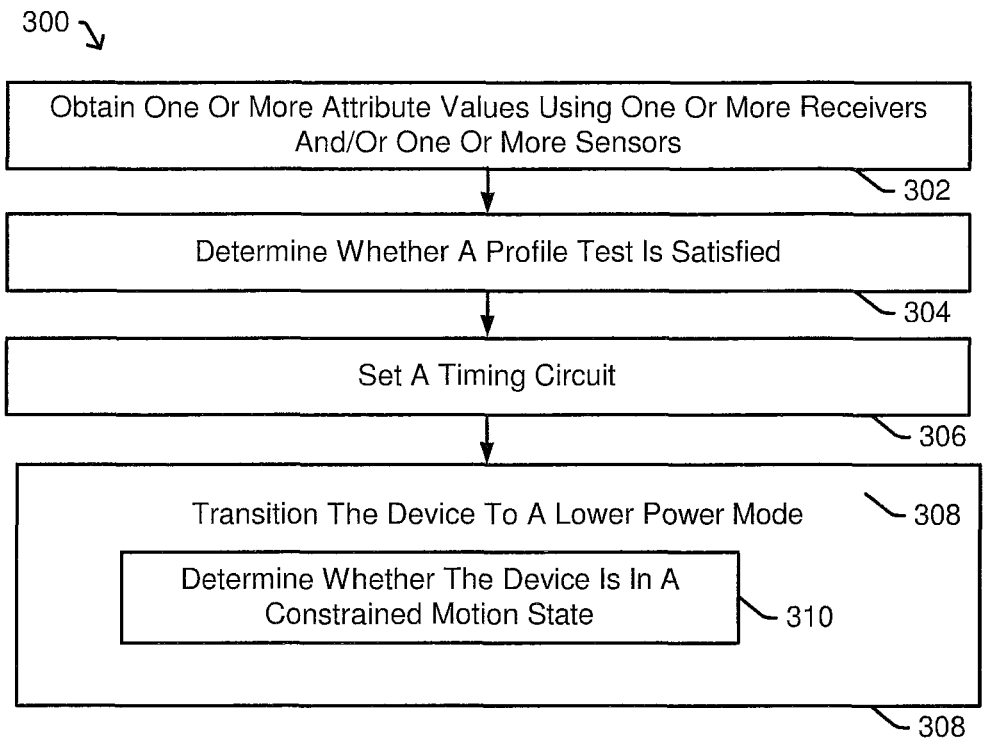
FIG. 3 is a flow diagram illustrating certain features of an example process or method for use in a device to characterize an environment and selectively transition between different operating modes while located within the environment, in accordance with an implementation.

FIG. 3 is a flow diagram illustrating certain features of an example process or method 300 for use at a device 102 that begins with the device operating in a higher power mode that may allow the device to compare various attribute values it may obtain while in an environment to existing profile tests, and if needed to establish a new or modified profile test based on what it may have learned about the environment, in accordance with an implementation.

At example block 302, with the device in a higher power mode, the device may determine one or more attribute values using one or more receivers and/or one or more sensors. For example, in certain instances a device may determine a strength value and/or a phase value for at least one signal received from a ground-based transmitter. For example, some form of a pilot signal may be received from a base station transmitter of a cellular communications network, and the device may determine a strength value based, at least in part, on one or more received signal strength measurements and a phase value based, at least in part, on one or more time phase measurements and/or the like. In certain instances, for example, such values may be singular or plural, for example a mean and variance, or simply a single value with an implied error estimate. As previously mentioned, and as may be included at block 302, additional attribute values may be based on measurements, etc., obtained using other receivers and/or various sensors to further characterize the environment.

At example block 304, it may be determined whether a profile test is satisfied, e.g., based, at least in part, by at least one of the attribute values from block 302. Thus, for example, one or more profile tests may be considered to determine if there might be a significant likelihood of a match between conditions specified in a profile test and corresponding attribute values from block 302. Those skilled in the art will understand that, in certain instances, some attribute values and corresponding test conditions may be weighted more heavily or lightly in such determinations, e.g., depending on the design, receiver and/or sensor operational capabilities, targeted environments, etc. Also, it should be recognized that a significant likelihood of a match is not necessarily limited to a perfect match for all tested conditions, but may represent a much lower level of certainty depending on various design considerations.

At example block 306, a timing circuit that may be used by the device when operating in at least a lower power mode may be set. For example, a timing circuit may be set based, at least in part, on a phase value for an acquired signal.

At example block 308, a device may transition to a lower power mode. Such a transition to a lower power mode may, for example, be predicated based at least in part on a profile test being satisfied at block 304 and possibly a timing circuit being set at block 306. The satisfied profile test may indicate that the device is likely to be within the characterized environment associated with the profile test. In certain instances, at block 310, a transition to a lower power mode may be further predicated based, at least in part, on a determination that the device is likely to be in a constrained motion state.

Figure 4:
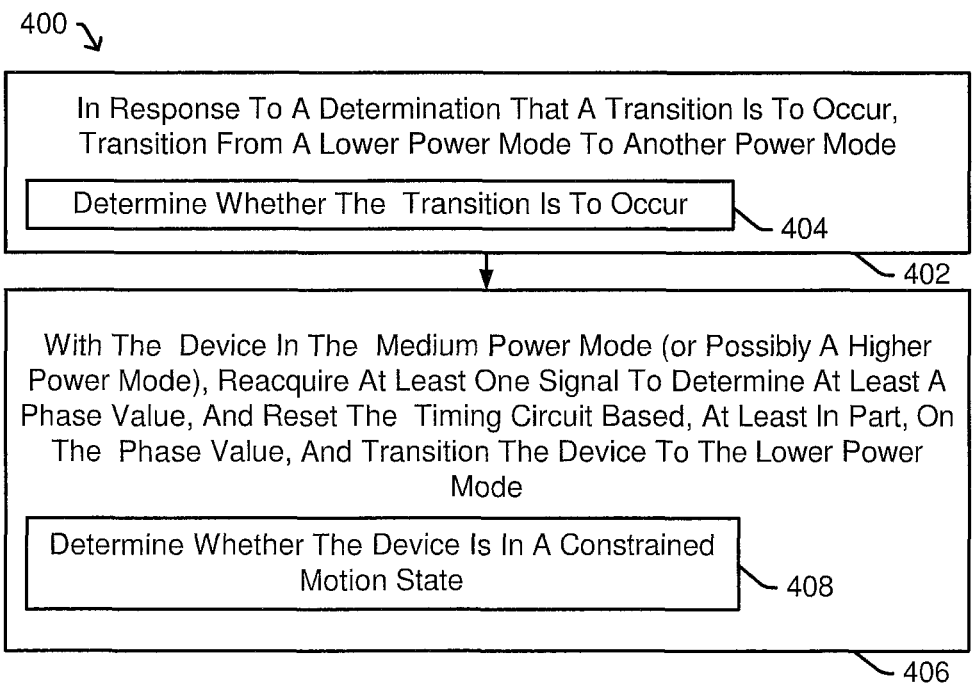
FIG. 4 is a flow diagram illustrating certain features of an example process or method for use in a device to selectively transition between different operating modes which may conserve power, in accordance with an implementation.

FIG. 4 is a flow diagram illustrating certain features of an example process or method 400 for use at a device 102 that begins with the device operating in a lower power mode (e.g., as a result of method 300) that may allow the device to selectively and/or otherwise intermittently transition to another mode, e.g., a medium power mode or even a higher power mode, in which one or more new attribute values may be determined and possibly used in some manner, in accordance with an implementation.

At example bock 402, with the device in a lower power mode, in response to a determination that a transition is to occur, the device may transition to another mode, e.g., a medium power mode or possibly a higher power mode. By way of example, one or more receivers and/or one or more sensors that may have been disabled with the device operating in the lower power mode may be enabled or otherwise used with the device in a medium power mode or a higher power mode. At block 404, circuitry within the device that is enabled with the device in a lower power mode may determine whether a transition is to occur, e.g., based, at least in part, on a time, a timer, a timing circuit, a schedule, one or more uncertainty values, a modeled function, a statistical function, and/or the like or some combination thereof.

At example block 406, with a device in a medium power mode (or possibly a higher power mode), an attempt may be made to reacquire at least one signal that was previously acquired to determine at least a new phase value. If a new phase value is determined, then a timing circuit (e.g., used by the device while operating in a lower power mode) may be reset or otherwise affected in some manner based, at least in part, on the new phase value, and the device may transition back to the lower power mode is a profile test remains satisfied. At block 408, in certain instances, a device may determine whether it is in a constrained motion state before transitioning back to the lower power mode, e.g., based, at least in part, on one or more attribute values for one or more receivers and/or one or more sensors.

Figure 5:
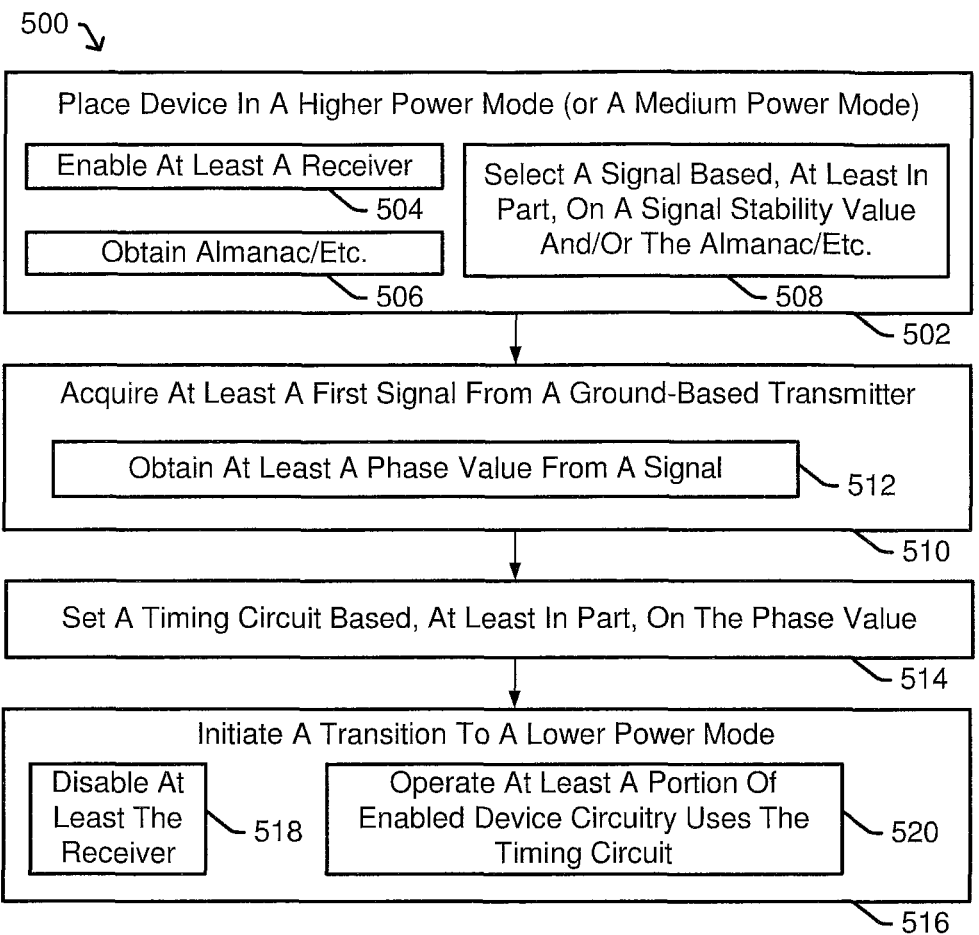
FIG. 5 is a flow diagram illustrating certain features of an example process or method for use in a device to selectively transition between different operating modes and set a timing circuit used in at least one of the modes, in accordance with an implementation.

FIG. 5 is a flow diagram illustrating certain features of an example process or method 500 for use at a device 102 to set a timing circuit that may be used with the device operating in a lower power mode, in accordance with an implementation.

At example block 502, a device may be placed in a higher power mode, or a medium power mode. As such, for example, at example block 504, at least one receiver may be enabled for use.

In certain example implementations, at block 506, a base station almanac and/or other like information may be obtained. In certain example implementations, at block example 508, one or more RF signals may be selected (e.g., for searching and possibly acquisition by one or more enabled receivers) based, at least in part, on one or more expected signal stability values and/or obtained information such as in one or more obtained base station almanacs, etc., or some portion thereof.

For example, a device may select one or more specific signals to acquire from one or more ground-based transmitters based, at least in part, on a comparison of corresponding signal stability values for available or expected signals. By way of example, a signal stability value may comprise or otherwise be based, at least in part, on: a type of received signal, a received signal strength measurement, a received signal phase drift measurement, a received signal frequency, a received signal frequency stability, a received signal availability measurement, a transmitter position uncertainty, a transmitter range, a transmitter power, a type of transmitter, a type of transmitter antenna, and/or the like or some combination thereof.

For, a device may obtain and use all or part of a base station almanac and/or other like data compilation (e.g., for at least one of the plurality of ground-based transmitters), and select one or more signals based, at least in part, on the base station almanac, as a cellular and/or other like "neighbor list", and/or other like data compilation(s)/file(s).

In certain example implementations, a device may combine or otherwise process almanac information or the like with its own clock state to determine an expected time and/or frequency window in which to search for signals transmitted from ground-based and/or satellite-based transmitters. For example, a time window may indicate a time at which the signal is more likely to be useful, and/or may indicate be a time at which a particular phase of a signal is expected, e.g., to reduce search uncertainty. Likewise, similar techniques may be used to reduce a frequency uncertainty. For example, if a device is likely to be indoors, it may be unlikely to have a high rate of speed. Thus, an expected Doppler uncertainty due to device motion may be reduced. Likewise, the growth in device position and clock uncertainty may be reduced, as well, e.g., as a direction function of the characterized environment or as a function of parameters derived from the environment characterization. A rate of growth of such example uncertainties may be factored into a determination as to an operating mode that the device may consider transitioning to at some point.

At example block 510, a device may acquire at least a first signal from a ground-based transmitter. At example block 512, a device may determine at least a phase value for the first signal. At example block 514, a device may set or otherwise operatively affect a timing circuit (e.g., used with the device operating in a lower power mode) based, at least in part, on a phase value, e.g., from example block 512.

At example block 516, a device may initiate a transition placing the device in a lower power mode. Here, as previously described, a device operating in a lower power mode may consume less electrical power than it does while operating in a higher power mode or a medium power mode (and possibly certain other power modes). At example block 518, a device may disable at least one receiver or some portion thereof which may have been enabled with the device in the higher power mode. At example block 520, at least a portion of enabled device circuit may be operated using a timing circuit as possibly set at block 514. For example, at least a portion of a processing unit or other corresponding logic circuitry may receive a clock signal or other like signal(s) from the timing circuit with the device in a lower power mode.

In certain example implementations, a timing circuit 260 (FIG. 2) may be referenced to an external time and/or frequency source, which may also enable easier acquisition of a signal modulated by a reference clock signal (e.g., GPS satellite signals, CDMA cellular signals, OFDM cellular signals, etc.) which may be used to obtain a position fix. Upon acquisition of such a signal, a device 102 (FIG. 1) may then synchronize timing circuit 260 to a reference clock signal.

Particular example implementations of device 102 may employ a tuning fork crystal oscillator (not shown) to advance and/or other operatively affect an internal clock time that may be provided by timing circuit 260. As tuning fork oscillators tend to be inexpensive but power efficient, they are typically not very accurate, e.g., necessitating frequent acquisition of an external signal for re-synchronization of internal clock time with a reference time. A tuning fork oscillator may oscillate at a frequency estimated by:

$$f = f_0[1 - 0.04 \text{ ppm}(T-T_0)^2]$$

Where $f_0$ and $T_0$ are process parameters; and T is the temperature of the oscillator. While this example a value of 0.04 ppm is used, it should be understood that in other implementations, different values (higher or lower) may be used.

Without knowledge of T, $f_0$ and $T_0$, one can only expect to typically achieve about 100 ppm accuracy. In addition, as the crystal ages, $f_0$ and $T_0$ may tend to drift. Some methods for improving accuracy of a tuning fork oscillator include temperature compensation (TCXO), heating (forcing a temperature—OCXO) and even microprocessor control. The latter case simply uses a microprocessor in place of the analog circuitry of the TCXO wherein the oscillator temperature is measured and the crystal's frequency is "pulled" toward a nominal frequency. These solutions tend to be costly and use significant power.

According to an implementation, a device time clock of timing circuit 260 may advanced by a tuning fork oscillator in periods between events to synchronize the device time clock with a reference time (e.g., through acquisition of a GPS signal, signal transmitted from a cellular base station, AFLT pilot, etc.). During these periods between synchronization events, a temperature of the oscillator may be intermittently measured using a sensor (e.g., to obtain T) for obtaining an estimate of the oscillator's frequency drift. The measured frequency drift may then be accumulated for estimating clock drift from the previous synchronization event. In one example implementation, a temperature sensor may be intermittently activated for obtaining sample measurements of the oscillator's temperature.

Also, at a synchronization event for obtaining a reference time (e.g., through acquisition of a GPS signal) a clock time which has been corrected from sampling oscillator temperature may be compared with the reference time (which is assumed to have no error) to obtain a clock error. This clock error may then be used for updating estimates of process parameters $f_0$ and $T_0$ for use in computing an estimate of f as shown above.

In certain example implementations, a device may define at least three modes: a first mode which may enable circuitry to acquire signals for obtaining a position fix and/or synchronize a device clock time with a reference clock; a second mode which may enable the oscillator to advance the device clock time; and a third mode which may enable a temperature sensor for sampling the temperature of the oscillator. Between events to synchronize the device clock with a reference time (e.g., by acquiring a signal as discussed above) the device may be intermittently "awakened" from the second mode to the third mode to obtain a temperature measurement sample. A temperature measurement sample or other like corresponding temperature value may be used for estimating an oscillator frequency drift and/or the like, which in turn may be accumulated for adjusting a device clock time of timing circuit 260.

One example process may comprise: (a) estimating parameters $f_0$ and $T_0$; (b) using signals with device in a first mode to zero out a timing error (e.g., synchronize with a reference time) and then disabling the receiver; (c) transitioning to a second mode (e.g., to sleep for a second or two) and using the oscillator of timing circuit 260 to advance clock time; (d) transitioning to a third mode and measuring an oscillator temperature; (e) calculating an "instantaneous frequency" f over a short period; (f) accumulating a drift in frequency from the instantaneous frequency to compute a correction to clock time; (g) repeating (c) through (f) for a period of time (e.g., several minutes); (h) transitioning to a first mode to re-acquire signal(s) to obtain a time reference (e.g., a phase value); (i) comparing the clock time to the time reference to determine error; (j) using the error to re-synchronize the time clock and update estimates of $f_0$ and $T_0$, and (k) possibly repeating (b) through (k).

Figure 6:
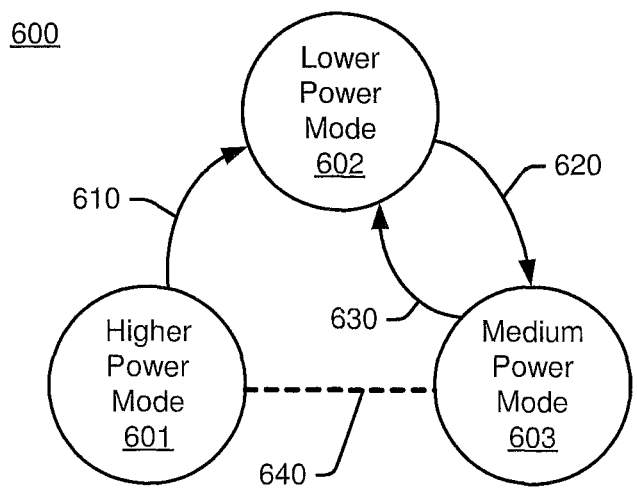
FIG. 6 is a diagram illustrating certain features of an example mode transitioning scheme that may be implemented in a device to conserve power, in accordance with an implementation.

Reference is made next to FIG. 6, which is a diagram illustrating certain features of an example mode transitioning scheme 600 that may be implemented in device 102 (FIG. 1) to conserve power, in accordance with an implementation.

Here, for example, device 102 may be placed in a higher power mode 601, e.g., as in block 502 (FIG. 5), and as such may receive and transmit wireless signals. In certain instances, higher power mode 601 may represent a fully powered on mode, an initial start-up mode, etc.

Device 102 may transition, between higher power mode 601 and a lower power mode 602, e.g., in response to certain conditions represented by conditional arrow 610. For example, arrow 610 transitioning device 102 from higher power mode 601 to lower power mode 602 may represent conditional processes as illustrated at one or more of blocks 306, 308 and/or 310 (FIG. 3), and/or one or more of blocks 516, 518, and/or 520 (FIG. 5). Hence, for example, with device 102 in lower power mode 602 wireless signals may not be received or transmitted by device 102. In certain instances, lower power mode 602 may represent a sleep mode which may reduce power consumption in comparison to higher power mode 601.

Device 102 may transition, between lower power mode 602 and a medium power mode 603, e.g., in response to certain conditions represented by conditional arrow 620. For example, arrow 620 transitioning device 102 from lower power mode 602 to medium power mode 603 may represent conditional processes as illustrated at one or more of blocks 402, and/or 404 (FIG. 4). Hence, for example, in medium power mode 603 a device may acquire but not transmit wireless signals.

Device 102 may transition, between medium power mode 603 and a lower power mode 602, e.g., in response to certain conditions represented by conditional arrow 630. For example, arrow 630 transitioning device 102 from medium power mode 603 to lower power mode 602 may represent conditional processes as illustrated at one or more of blocks 406, 408, and/or 410 (FIG. 4).

As illustrated by dashed line 640, in certain implementations, higher power mode 601 may comprise medium power mode 603. For example, higher power mode 601 may permit device 102 to receive wireless signals, use various sensors, etc., as might medium power mode 603. As such, conditional arrow 620 may similarly represent a transition from lower power mode 602 to higher power mode 601, and conditional arrow 620 may represent a transition (similar to that of conditional arrow 610) from higher power mode 601 to lower power mode 602. Indeed, in certain example implementations, device 102 may simply have two modes of operation, namely, higher power mode 601 and lower power mode 602, which conditional arrows applied as above.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "maintaining," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with a device operable in a plurality of selectable power modes:
    setting a timing circuit based, at least in part, on a phase value obtained from a signal acquired from a ground-based transmitter, wherein said signal comprises a pilot signal and said phase value is determined based, at least in part, on one or more time phase measurements of said pilot signal; and transitioning operation of said device to a lower power mode, wherein at least a portion of a receiver used to acquire said signal is disabled and at least a portion of enabled device circuitry uses said timing circuit, based, at least in part, on at least one of:
  a determination that a profile test indicating that said device is within a characterized environment is satisfied, at least in part, by said phase value; or
  a determination based, at least in part, on said phase value, that said device is in a constrained motion state.

2. The method of claim 1, and further comprising:
transitioning operation of said device to said lower power mode based further, at least in part, on one or more attribute values.

3. The method of claim 2, wherein at least one of said one or more attribute values is obtained from one or more signals from at least one of: an inertial sensor; or an environment sensor.

4. The method of claim 1, and further comprising, with said device operating in a power mode other than said lower power mode:
  enabling said receiver to reacquire said signal and obtain at least a new phase value from said reacquired signal;
  resetting said timing circuit based, at least in part, on said new phase value; and
  operating said device in said lower power mode using said reset timing circuit.

5. The method of claim 4, and further comprising:
in response to a failure to reacquire said signal, attempting to acquire a second signal from at least one other ground-based transmitter to obtain a second phase value from said second signal and reset said timing circuit based, at least in part, on said second phase value; and
operating said device in said lower power mode using said reset timing circuit.

6. The method of claim 1, and further comprising, with said device operating in a power mode other than said lower power mode:
  using said receiver to perform a search for signals transmitted from a plurality of ground-based transmitters; and
  selecting said signal from a plurality of signals identified in said search based, at least in part, on a comparison of corresponding signal stability values for said plurality of signals.

7. The method of claim 6, wherein at least one of said signal stability values is based, at least in part, on at least one of: a type of received signal; a received signal strength measurement; a received signal phase drift measurement; a received signal frequency; a received signal frequency stability; a received signal availability measurement; a transmitter position uncertainty; a transmitter range; a transmitter power; a type of transmitter; a type of transmitter antenna.

8. The method of claim 1, and further comprising, with said device operating in a power mode other than said lower power mode:
  accessing, for one or more ground-based transmitters, at least a portion of at least one of: a base station almanac; or a neighbor list; and
  selecting said signal based, at least in part, on said at least said portion.

9. The method of claim 1, and further comprising:
enabling use of at least one of: a transmitter; or said receiver while said device is operating in a power mode other than said lower power mode.

10. An apparatus for use in a device operable in a plurality of selectable power modes, the apparatus comprising:
  means for setting a timing circuit based, at least in part, on a phase value obtained from a signal acquired from a ground-based transmitter, wherein said signal comprises a pilot signal and said phase value is determined based, at least in part, on one or more time phase measurements of said pilot signal; and
  means for transitioning operation of said device to a lower power mode, wherein while said device is operating in said lower power mode at least a portion of a receiver used to acquire said signal is disabled and at least a portion of enabled device circuitry uses said timing circuit, based, at least in part, on at least one of:
    a determination that a profile test indicating that said device is within a characterized environment is satisfied, at least in part, by said phase value; or
    a determination based, at least in part, on said phase value, that said device is in a constrained motion state.

11. The apparatus of claim 10, and further comprising:
  means for transitioning operation of said device to said lower power mode based further, at least in part, on one or more attribute values.

12. The apparatus of claim 11, wherein at least one of said one or more attribute values is obtained from one or more signals from at least one of: an inertial sensor; or an environment sensor.

13. The apparatus of claim 10, and further comprising, with said device operating in a power mode other than said lower power mode:
  means for attempting to reacquire said signal and obtain at least a new phase value from said reacquired signal;
  means for resetting said timing circuit based, at least in part, on said new phase value; and
  means for operating said device in said lower power mode using said reset timing circuit.

14. The apparatus of claim 13, and further comprising:
  means for attempting to acquire a second signal from at least one other ground-based transmitter and obtain a second phase value from said second signal, in response to a failure to reacquire said signal;
  means for resetting said timing circuit based, at least in part, on said second phase value; and
  operating said device in said lower power mode using said reset timing circuit.

15. The apparatus of claim 10, and further comprising, with said device operating in a power mode other than said lower power mode:
  means for performing a search for signals transmitted from a plurality of ground-based transmitters; and
  means for selecting said signal from a plurality of signals identified in said search.

16. A device operable in a plurality of selectable power modes, the device comprising:
  a receiver;
  a timing circuit; and
  a processing unit to:
    set the timing circuit based, at least in part, on a phase value obtained from a signal acquired from a ground-based transmitter using said receiver, wherein said signal comprises a pilot signal and said phase value is determined based, at least in part, on one or more time phase measurements of said pilot signal; and
    transition operation of said device to a lower power mode, wherein at least a portion of said receiver is disabled and at least a portion of enabled device circuitry uses said timing circuit, based, at least in part, on at least one of:

a determination that a profile test indicating that said device is within a characterized environment is satisfied, at least in part, by said phase value; or a determination based, at least in part, on said phase value, that said device is in a constrained motion state.

17. The device of claim 16, said processing unit to further:
transition operation of said device to said lower power mode based further, at least in part, on a determination that said one or more attribute values.

18. The device of claim 17, and further comprising at least one of: an inertial sensor; or an environment sensor, and wherein at least one of said one or more attribute values is obtained from one or more signals from at least one of: said inertial sensor; or said environment sensor.

19. The device of claim 16, said processing unit to further, with said device operating in a power mode other than said lower power mode:
attempt to reacquire said signal using said receiver and obtain at least a new phase value from said signal;
reset said timing circuit based, at least in part, on said new phase value; and
operate said device in said lower power mode using said reset timing circuit.

20. The device of claim 19, said processing unit to further:
in response to a failure to reacquire said signal, attempt to acquire a second signal from at least one other ground-based transmitter using said receiver and obtain a second phase value from said second signal;
reset said timing circuit based, at least in part, on said second phase value; and
operate said device in said lower power mode using said reset timing circuit.

21. The device of claim 16, said processing unit to further, with said device operating in a power mode other than said lower power mode: use said receiver to perform a search for signals transmitted from a plurality of ground-based transmitters; and select said signal from a plurality of signals identified in said search based, at least in part, on a comparison of corresponding signal stability values for said plurality of signals.

22. The device of claim 16, said processing unit to further, with said device operating in a power mode other than said lower power mode: access, for one or more ground-based transmitters, at least a portion of at least one of: a base station almanac; or a neighbor list, and select said signal based, at least in part, on said at least said portion.

23. The device of claim 16, and further comprising a transmitter, with said device operating in a power mode other than said lower power mode, said processing unit to further enable use of at least one of: said transmitter, or said receiver.

24. A non-transitory computer readable medium comprising computer implementable instructions executable by a processing unit of a device to:
set a timing circuit based, at least in part, on a phase value obtained from a signal acquired from a ground-based transmitter, wherein said signal comprises a pilot signal and said phase value is determined based, at least in part, on one or more time phase measurements of said pilot signal; and
transition operation of said device to a lower power mode wherein while said device is operating in said lower power mode at least a portion of a receiver used to acquire said signal is disabled and at least a portion of enabled device circuitry uses said timing circuit, based, at least in part, on at least one of:
a determination that a profile test indicating that said device is within a characterized environment is satisfied, at least in part, by said phase value; or
a determination based, at least in part, on said phase value, that said device is in a constrained motion state.

25. The article non-transitory computer readable medium of claim 24, said computer implementable instructions being further executable by said processing unit to:
transition operation of said device to said lower power mode based further, at least in part, on one or more attribute values.

26. The non-transitory computer readable medium of claim 25, wherein at least one of said one or more attribute values is obtained from one or more signals from at least one of: an inertial sensor; or an environment sensor.

27. The non-transitory computer readable medium of claim 24, said computer implementable instructions being further executable by said processing unit to, with said device operating in a power mode other than said lower power mode:
attempt to reacquire said signal to obtain at least a new phase value;
reset said timing circuit based, at least in part, on said new phase value; and
operate said device in said lower power mode using said reset timing circuit.

28. The non-transitory computer readable medium of claim 27, said computer implementable instructions being further executable by said processing unit to:
in response to a failure to reacquire said signal, attempt to acquire a second signal from at least one other ground-based transmitter using said receiver to obtain a second phase value for said second signal;
reset said timing circuit based, at least in part, on said second phase value; and
operate said device in said lower power mode using said reset timing circuit.

29. The non-transitory computer readable medium of claim 24, said computer implementable instructions being further executable by said processing unit to, with said device operating in a power mode other than said lower power mode:
initiate said receiver to perform a search for signals transmitted from a plurality of ground-based transmitters; and
select said signal from a plurality of signals identified in said search based, at least in part, on a comparison of corresponding signal stability values for said plurality of signals.

30. The non-transitory computer readable medium of claim 24, said computer implementable instructions being further executable by said processing unit to, with said device operating in a power mode other than said lower power mode: access, for one or more ground-based transmitters, at least a portion of at least one of: a base station almanac; or a neighbor list; and select said signal based, at least in part, on said at least said portion.

* * * * *